US008515675B2

(12) United States Patent
Stoesz

(10) Patent No.: US 8,515,675 B2
(45) Date of Patent: Aug. 20, 2013

(54) METHOD FOR ANALYZING STRAIN DATA

(75) Inventor: Carl W. Stoesz, Houston, TX (US)

(73) Assignee: Bakes Hughes Incorporated, Houston, TX (US)

( * ) Notice: Subject to any disclaimer, the term of this patent is extended or adjusted under 35 U.S.C. 154(b) by 799 days.

(21) Appl. No.: 12/061,258

(22) Filed: Apr. 2, 2008

(65) Prior Publication Data
US 2009/0254280 A1    Oct. 8, 2009

(51) Int. Cl.
G01V 3/18    (2006.01)
G01V 9/00    (2006.01)
G01V 3/38    (2006.01)
G01B 7/00    (2006.01)

(52) U.S. Cl.
USPC ............. 702/6; 702/11; 702/13; 702/155

(58) Field of Classification Search
USPC ............. 356/73.1, 70, 477–478, 485, 491, 356/492, 601, 627, 241.1; 359/32, 33, 245, 359/264; 367/25–30; 385/100, 104, 8–10; 250/227.14, 227.24, 227.18, 231.1; 703/1, 703/2, 4, 5, 6, 9, 10, 11; 73/152.51–152.59, 73/760, 763, 767, 772, 781, 783; 702/6, 702/9, 11, 12, 13, 179, 182, 42, 155, 159
See application file for complete search history.

(56) References Cited

U.S. PATENT DOCUMENTS

| | | | |
|---|---|---|---|
| 3,844,659 A | 10/1974 | Baganoff | |
| 4,288,852 A | 9/1981 | Holland | |
| 4,322,162 A | 3/1982 | McKelvie et al. | |
| 4,352,565 A | 10/1982 | Rowe et al. | |
| 4,433,385 A | 2/1984 | De Gasperi et al. | |
| 4,591,996 A | 5/1986 | Vachon | |
| 4,598,420 A | 7/1986 | Harvey | |
| 5,061,069 A | 10/1991 | Califano | |
| 5,064,270 A | 11/1991 | Turpin et al. | |
| 5,065,331 A | 11/1991 | Vachon et al. | |
| 5,513,913 A | 5/1996 | Ball et al. | |

(Continued)

FOREIGN PATENT DOCUMENTS
WO    92/21848 A1    12/1992

OTHER PUBLICATIONS

Blandino, et al. "Three-Dimensional Shape Sensing for Inflatable Booms". 46th AIAA/ASME/ASCE/AHS/ASC Structures, Structural Dynamics & Materials Conference. Apr. 18-21, 2005, Austin, Texas. pp. 1-10.

(Continued)

Primary Examiner — Marc Armand
Assistant Examiner — Ricky Ngon
(74) Attorney, Agent, or Firm — Cantor Colburn LLP

(57) ABSTRACT

A method for estimating a shape, the method including: selecting a structure comprising a plurality of strain sensors inoperable communication with the structure, each strain sensor configured to provide a strain measurement; placing the structure in a borehole; receiving the strain measurements from the plurality of strain sensors; creating a mesh grid having nodes, each node related to a location of one strain sensor and assigned a strain value measured by the one strain sensor; creating an additional node for the mesh grid wherein a strain value assigned to the additional node is derived from the strain value corresponding to at least one adjacent node; and performing an inverse finite method using the mesh grid with the assigned strain values to estimate the shape.

20 Claims, 5 Drawing Sheets

(56) References Cited

U.S. PATENT DOCUMENTS

| | | | |
|---|---|---|---|
| 5,563,967 A | 10/1996 | Haake | |
| 5,649,035 A | 7/1997 | Zimmerman et al. | |
| 5,723,857 A | 3/1998 | Underwood et al. | |
| 5,760,391 A | 6/1998 | Narendran | |
| 5,867,258 A | 2/1999 | Frederick et al. | |
| 5,963,321 A | 10/1999 | Wang | |
| 6,040,900 A | 3/2000 | Chen | |
| 6,043,870 A | 3/2000 | Chen | |
| 6,256,090 B1 * | 7/2001 | Chen et al. | 356/73.1 |
| 6,426,796 B1 | 7/2002 | Pulliam et al. | |
| 6,687,011 B1 | 2/2004 | Lee et al. | |
| 6,813,403 B2 | 11/2004 | Tennyson | |
| 7,006,918 B2 * | 2/2006 | Economides et al. | 702/1 |
| 7,126,693 B2 | 10/2006 | Everett et al. | |
| 7,164,478 B2 | 1/2007 | Johnson et al. | |
| 7,245,791 B2 * | 7/2007 | Rambow et al. | 385/12 |
| 7,380,466 B2 * | 6/2008 | Deeg | 73/803 |
| 7,590,512 B2 * | 9/2009 | Shimada et al. | 703/2 |
| 2003/0150263 A1 | 8/2003 | Economides et al. | |
| 2005/0071091 A1 | 3/2005 | Dong et al. | |
| 2005/0213103 A1 | 9/2005 | Everett et al. | |
| 2007/0260427 A1 | 11/2007 | Kim | |

OTHER PUBLICATIONS

Ilankamban, et al. "Back Load Calculation, A Method of Measuring Component Loads Without Load Cells". Ford Motor Company. Apr. 16, 1996.

Tessler, et al. "Accurate Interlaminar Stress Recovery from Finite Element Analysis". NASA Technical Memorandum 109149. Sep. 1994.

Tessler, et al. "A Novel Four-Node Quadrilateral Smoothing Element for Stress Enhancement and Error Estimation". International Journal for Numerical Methods in Engineering. Int. J. Numer. Meth. Engng. 44, 1527-1543 (1999).

Tessler, et al. "Structural Analysis Methods for Structural Health Management of Future Aerospace Vehicles". NASA/TM-2007-214871. Apr. 2007.

Tessler, et al. "A Variational Principle for Reconstruction of Elastic Deformations in Shear Deformable Plates and Shells". NASA/TM-2003-212445. Aug. 2003.

Vazquez, et al. "Structural Health Monitoring Using High-Density Fiber Optic Strain Sensor and Inverse Finite Element Methods". NASA/TM 2005-213761. May 2005.

Tessler, et al. "Inverse FEM for Full-Field Reconstructiono f Elastic Deformations in Shear Deformable Plates and Shells". NASA Center. Publication Date: 2004.

Childers, et al. "Recent developments in the application of optical frequency domain reflectometry to distributed Bragg grating sensing". Proc. SPIE vol. 4578, p. 19-31, Fiber Optic Sensor Technology and Applications 2001. Feb. 2002.

Childers, et al. "Downhole Fiber Optic Real-Time Casing Monitor". Industrial and Commercial Applications of Smart Structures Technologies 2007. Edited by Davis, L. Porter; Henderson, B.K.; McMickell, M. Brett. Proceedings of the SPIE, Volue 6527, pp. 65270J (2007).

International Search Report and Written Opinion, mailed on Oct. 16, 2009, International Application No. PCT/US2009/038483, Written Opinion 5 pages, International Search Report 3 pages.

* cited by examiner

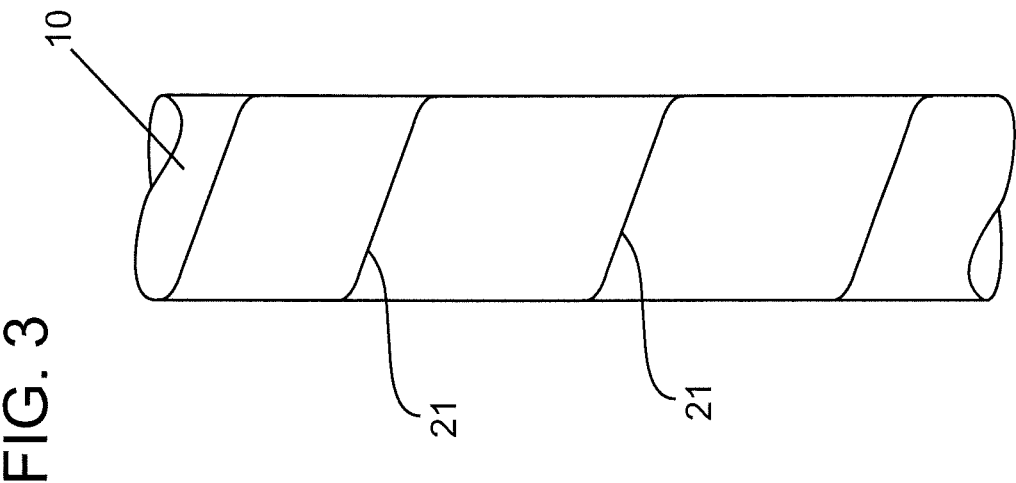
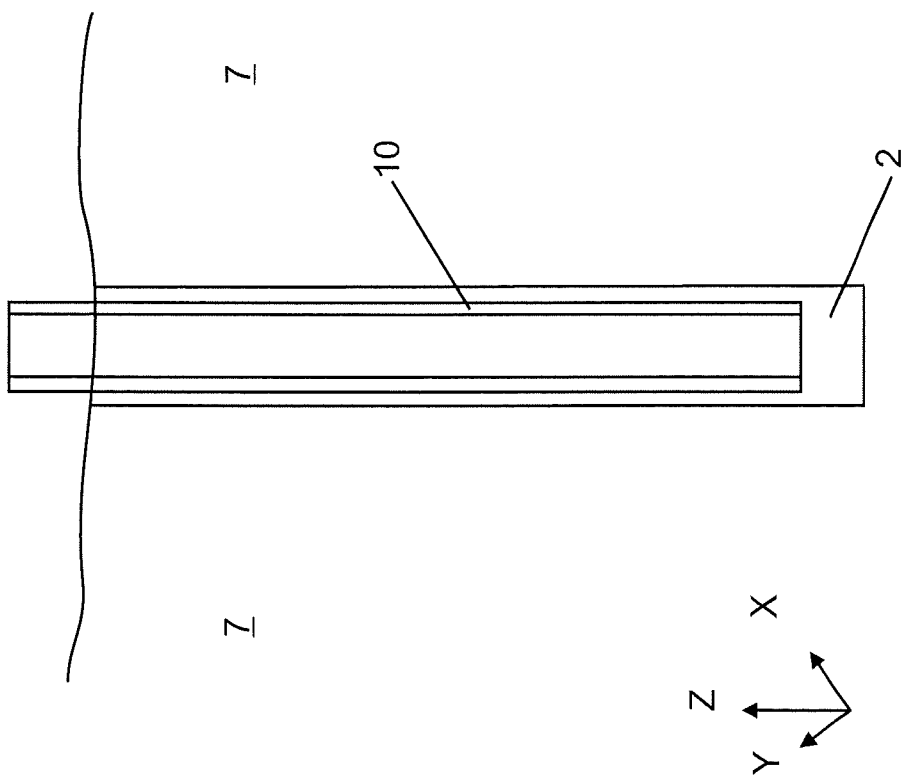

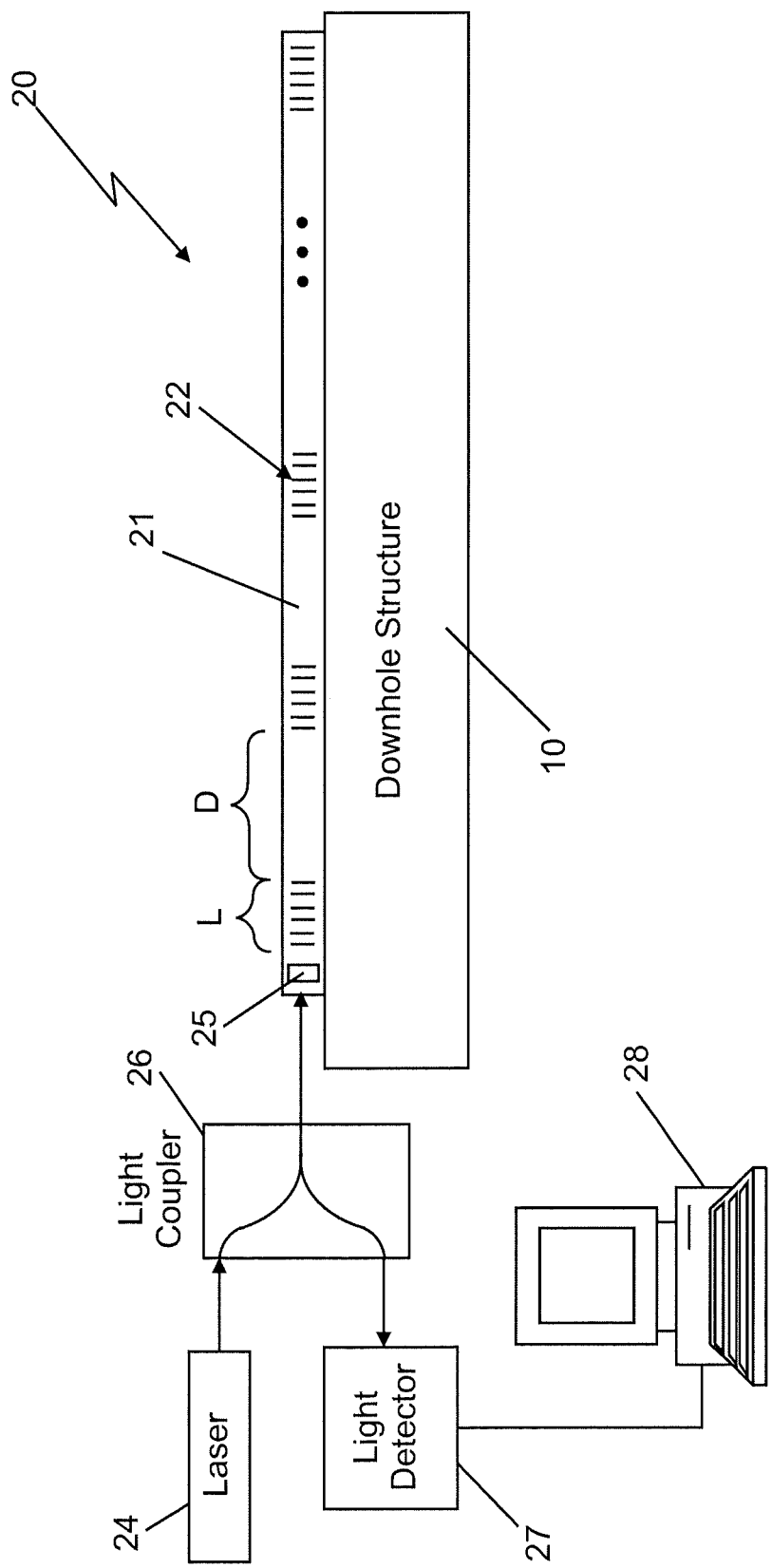

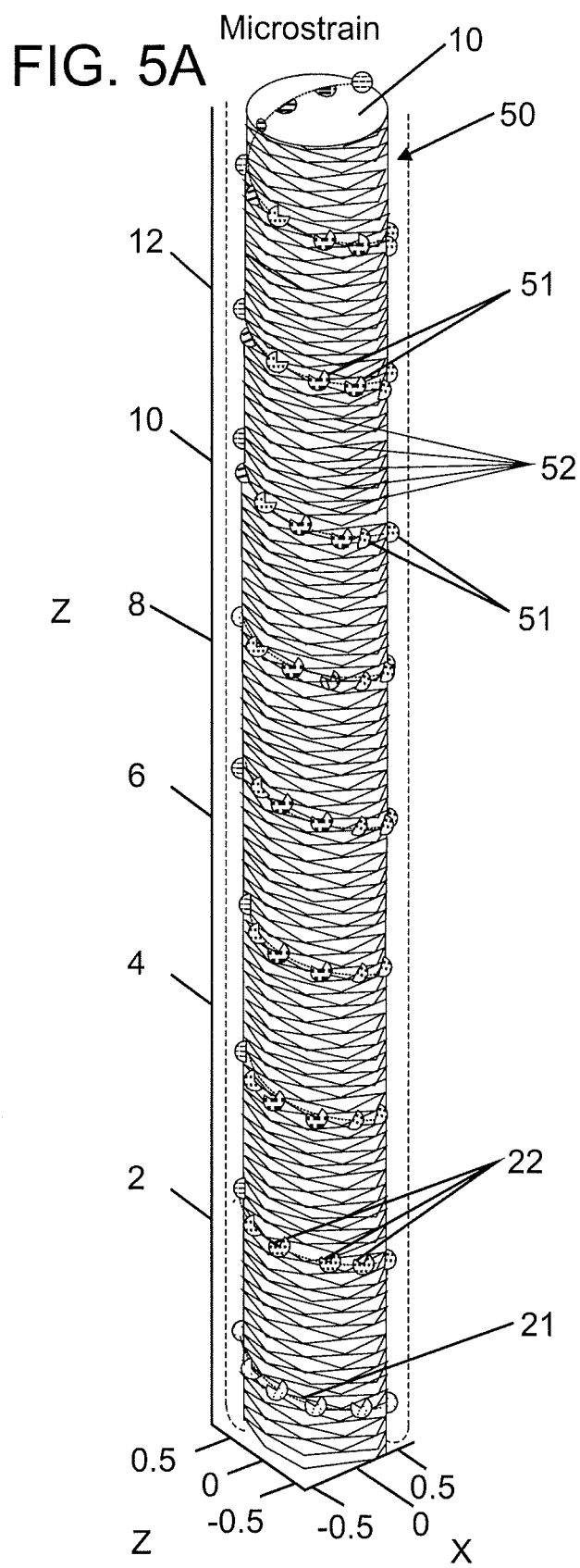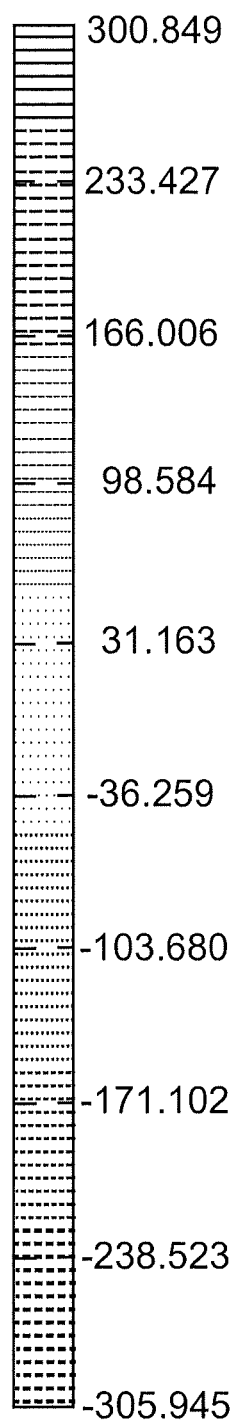
FIG. 5A
FIG. 5B

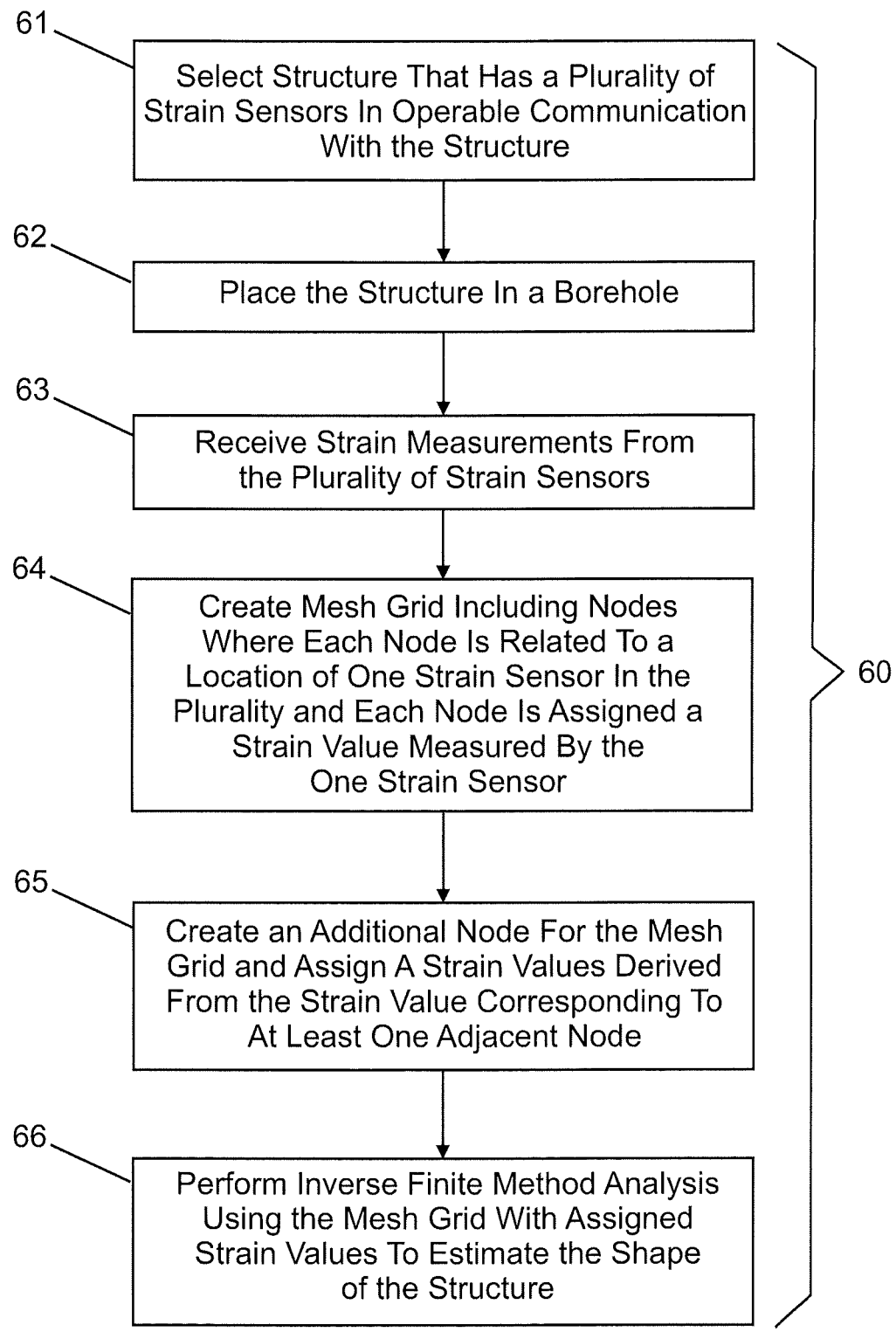

METHOD FOR ANALYZING STRAIN DATA

BACKGROUND OF THE INVENTION

1. Field of the Invention

This invention relates to structural damage detection systems for structures in a borehole and, more particularly, to structural damage detection systems utilizing optical fibers.

2. Description of the Related Art

Exploration and production of hydrocarbons generally require a borehole be drilled into a geologic formation. Various structures may be called upon to be inserted into the borehole as part of the exploration and production. Examples of these structures include a borehole casing and a sand screen.

Due to instabilities in the formation such as reservoir compaction, the formation may exert a force on a downhole structure high enough to deform the structure. If the downhole structure is deformed, it is important to know the extent of the deformation. By having knowledge of the deformation, mitigating or corrective actions can be initiated.

One method to measure a deformation is to attach strain sensors to the downhole structure prior to the structure being placed in the borehole. Each strain sensor provides a measurement of the strain experienced by the structure at the location of the sensor. With enough sensors, it is possible to determine a deformation and therefore a shape of the downhole structure. Data from the sensors is processed using an algorithm to determine the deformation. However, depending on the number of sensors, locations of the sensors, and discontinuities in the data, it is possible for the algorithm not to converge on an accurate solution and, therefore, not determine the shape.

Therefore, what are needed are various techniques to accurately determine the shape of a structure downhole.

BRIEF SUMMARY OF THE INVENTION

Disclosed is one example of a method for estimating a shape, the method including: selecting a structure comprising a plurality of strain sensors inoperable communication with the structure, each strain sensor configured to provide a strain measurement; placing the structure in a borehole; receiving the strain measurements from the plurality of strain sensors; creating a mesh grid having nodes, each node related to a location of one strain sensor and assigned a strain value measured by the one strain sensor; creating an additional node for the mesh grid wherein a strain value assigned to the additional node is derived from the strain value corresponding to at least one adjacent node; and performing an inverse finite method using the mesh grid with the assigned strain values to estimate the shape.

Also disclosed is an embodiment of a system for estimating a shape of a downhole structure, the system including: the downhole structure; a plurality of strain sensors in operable communication with the downhole structure, each strain sensor providing a strain measurement; and a processing unit in operable communication with the plurality of strain sensors wherein the processing unit: processes the strain measurements from the strain sensors; creates a mesh grid having nodes, each node related to a location of one strain sensor and assigned a strain value measured by the one strain sensor; creates an additional node for the mesh grid wherein a strain value assigned to the additional node is derived from the strain value corresponding to at least one adjacent node; and performs an inverse finite method using the mesh grid with the assigned strain values to estimate the shape.

Further disclosed is an embodiment of A computer program product comprising machine readable instructions stored on machine readable media for estimating a shape of a downhole structure, the product having machine executable instructions for: receiving strain measurements from a plurality of strain sensors in operable communication with the downhole structure; creating a mesh grid having nodes, each node related to a location of one strain sensor and assigned a strain value measured by the one strain sensor; creating an additional node for the mesh grid wherein a strain value assigned to the additional node is derived from the strain value corresponding to at least one adjacent node; performing an inverse finite method using the mesh grid with the assigned strain values to estimate the shape; and at least one of recording the shape and displaying the shape to a user.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 1 is an exemplary embodiment of a structure disposed in a borehole penetrating the earth;

FIG. 2 is an exemplary embodiment of a fiber optic strain system;

FIG. 3 illustrates an optical fiber containing a plurality of fiber Bragg gratings disposed upon the structure;

FIG. 5 illustrates a three dimensional view of the exemplary embodiment of the optical fiber disposed upon the structure in a spiral fashion; and FIG. 6 presents an example of a method for estimating a shape of a downhole structure.

DETAILED DESCRIPTION OF THE INVENTION

Figure 4A:
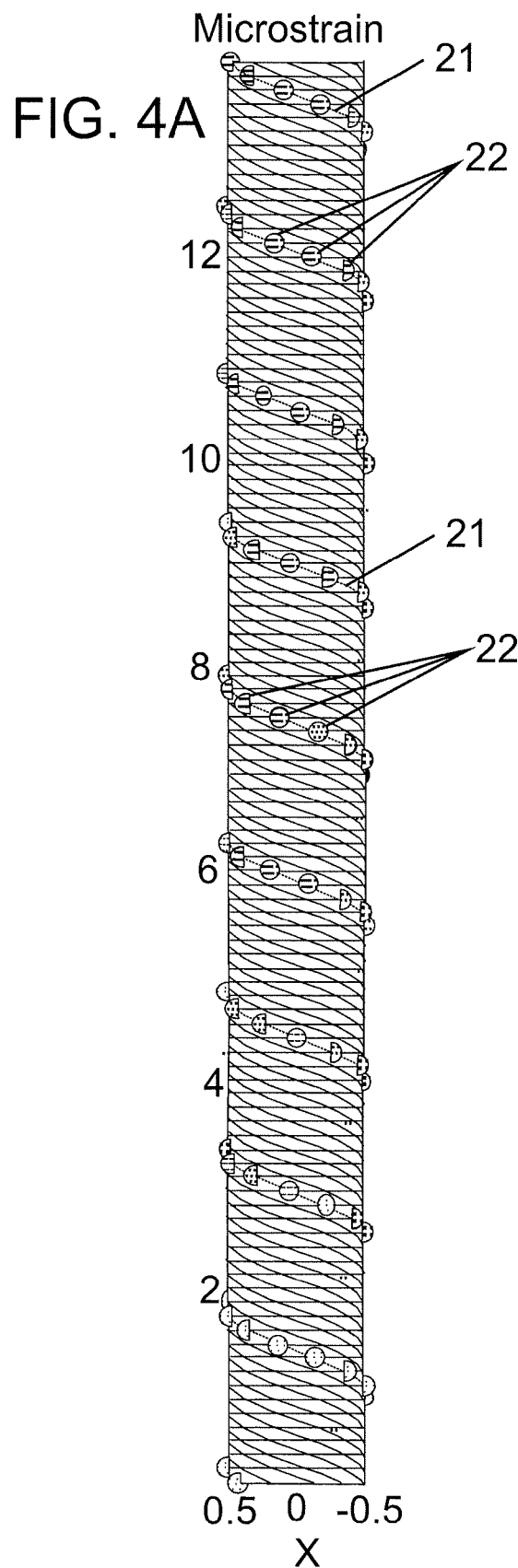
FIG. 4 illustrates a side view of an exemplary embodiment of the optical fiber disposed upon the structure in a spiral fashion.

Disclosed are exemplary techniques for accurately estimating a shape of a downhole structure. The techniques, which include apparatus and method, use a plurality of strain sensors. The strain sensors measure strains experienced by the downhole structure at the locations of the sensors. A processing system uses an algorithm to process measurements from the strain sensors to provide the shape (or deformation) of the downhole structure.

Normally if a known load is applied to a structure, the resulting strain experienced by the structure can be calculated via a finite element analysis. However, when the load is unknown such as in a downhole environment and the strains as measured by the strain sensors are known, then an inverse finite element method is used to estimate the deformation or the new shape resulting from the strains. The inverse finite element method can be implemented with commercially available mathematics computer programs such as MATLAB® from The MathWorks of Natick, Mass.

With the inverse finite element method, a mesh grid similar to the mesh grid used in finite method analysis is created. In one embodiment of the mesh grid, the mesh grid is created from interconnected nodes, which can form various shapes referred to as "elements." Examples of the elements include shapes with three sides or four sides. Each side can be straight or curved. When a straight line with two nodes as end points is used to define a side, the element is referred to as "linear." When a line with three nodes is used to define a side whether straight or curved, then the element is referred to as "quadratic." Similarly, when a line with four nodes is used to define a side, then the element is referred to as "cubic."

The nodes generally correspond to the sensor locations. It is important for the nodes to be spaced close enough together to insure that the inverse finite method converges to an accurate solution and, therefore, provide an accurate shape of the downhole structure. However, there may not be an adequate number of strain sensors and, therefore, an adequate number of nodes with an appropriate spacing to converge on an accurate solution. In this situation, the teachings provide for creating additional nodes and assigning strain values to the additional nodes. Additional mesh elements may also be created from the additional nodes. In general, the additional nodes are created for the mesh grid before the inverse finite element method is executed.

When an additional node is created, the node does not correspond to a location of a strain sensor. Therefore, a strain value is assigned to the additional node. The strain value is determined using strain values from adjacent nodes that correspond to strain sensor locations and an interpolation method. One example of the interpolation method is linear interpolation. With linear interpolation, the value is proportional to the distance from the nodes with known strain values. For example, if node 1 has a strain value of 20 and node 2 has a strain value of 60, then if node 3 is created half way between node 1 and node 2, node 3 will be assigned a strain value of 40 [((60−20)/2)+20=40]. Other interpolation methods, including non-linear methods, can be used to smooth the interpolated data between the known data.

For convenience, certain definitions are presented for use throughout the specification. The term "strain sensor" relates to a sensor attached to or embedded in a structure wherein the sensor measures strain experienced by the structure. The term "mesh grid" relates to a grid that discretizes the continuous domain of a structure into many elements. The elements may take many forms such as triangles, rectangles, parallelograms, etc. As used herein, a node forming an element or representing an element is associated with a strain value either measured or assigned. The term "strain sensors in operable communication with the structure" relates to strain sensors that can measure a strain experienced by the structure. Measurements of strain are transmitted to a processing unit as "strain data" or "strain measurements." The term "smoothing" relates to creating new nodes in locations that prevent or limit any discontinuity in the lines formed by interconnected elements.

A structure whose shape is estimated using the teachings herein is now presented. Referring to FIG. 1, a structure 10 is shown disposed in a borehole 2 penetrating the earth 7. In the embodiment of FIG. 1, the structure 10 is a borehole casing. In another embodiment, the structure 10 can be a sand screen (i.e., a perforated casing surrounded by a screen to keep sand from entering the casing). The structure 10 represents any structure placed in the borehole 2 wherein it is desired to know if the structure undergoes any deformation or change in shape.

As discussed above, strain sensors are used to monitor strains experienced by the structure 10. Each strain sensor may be attached to the structure 10, by adhesive for example, or embedded into the structure 10. It is advantageous to use as many sensors as possible in order to obtain a fine mesh grid. The finer the mesh grid, the more accurate the estimated shape of the structure 10 will be. Hundreds or thousands of strain sensor may be used with optical frequency domain reflectometry (OFDR)

A simplified example of a Fiber Optic Strain System (FOSS) 20 using OFDR is shown in FIG. 2. Referring to FIG. 2, the FOSS 20 includes an optical fiber 21. The optical fiber 21 includes a plurality of fiber Bragg gratings 22 (or more generally strain sensors 22) spaced periodically in the fiber 21. Each fiber Bragg grating 22 has a length, L, and a periodic distance, D, to an adjacent grating 22. In one embodiment, L is about 5 mm and D is about 10 mm. As the structure 10 experiences strain, the grating 22 at a strain location will expand or contract in accordance with the amount of strain. The expansion or contraction will alter the optical path length between successive elements 23 within the grating 22, thereby shifting the wavelength of the light reflected by the grating 22. In other words, the wavelength of the reflected light corresponds to the strain experienced by the structure 10 at the location of the grating 22. FIG. 3 illustrates an embodiment of the optical fiber 21 disposed upon the structure 10.

Referring to FIG. 2, a scanning laser 24 is used to illuminate the gratings 22. In addition, a reference reflector 25 is used to form an interferometer with each of the gratings 22. The light reflected from each grating 22 causes an interference in the interferometer. The interference causes a signal (corresponding to the strain experienced by the structure 10) from each grating 22 to be modulated at a unique frequency. The signal from each grating 22 is thereby mapped to the unique frequency on a spectrum of frequencies corresponding to all the gratings 22. Each of the individual signals may be retrieved from the spectrum of frequencies using a bandpass filter function.

Other multiplexing schemes may be used as known in the art to receive signals from the fiber Brag gratings 22. Examples of other multiplexing schemes include time domain, amplitude, phase, and polarization.

Again referring to FIG. 2, light emitted from the scanning laser 24 is transmitted through a light coupler 26, and then enters the optical fiber 21. The light reflected by the fiber Bragg gratings 22 is transmitted through the coupler 26, and is detected by light detector 27. The light detector 27 is coupled to a processing unit 28. The processing unit 28 receives strain measurements from the light detector 27 that are related to the strain values measured by each grating 22.

Generally, the processing unit 28 includes components as necessary to provide for the real time processing of data (strain measurements) from the light detector 27. Exemplary components include, without limitation, at least one processor, storage, memory, input devices, output devices and the like. As these components are known to those skilled in the art, these are not depicted in any detail herein.

Figure 4B:
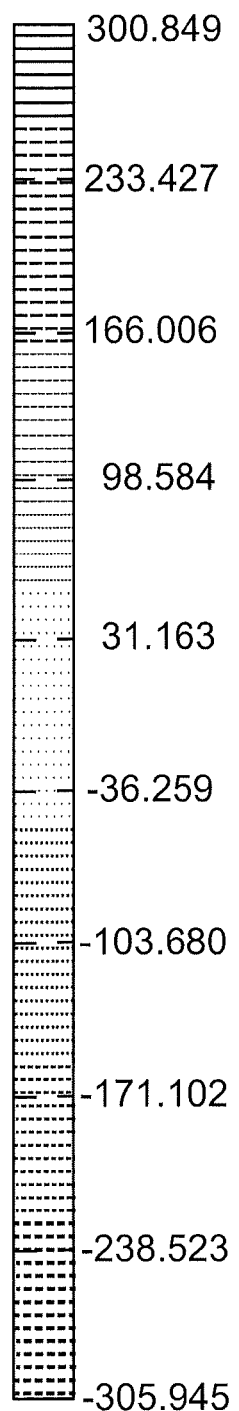

FIG. 4 illustrates a side view of an exemplary embodiment of the optical fiber 21 disposed upon the structure 10 in a spiral fashion. Each dot on the fiber 21 represents one grating 22 or strain sensor 22. FIG. 5 illustrates a three-dimensional view of the structure 10 depicted in FIG. 4. Referring to FIG. 5, a mesh grid 50 is shown overlaid upon the structure 10. The mesh grid 50 includes a plurality of mesh elements defined by nodes 51. A side of each mesh element is defined by two or more of the nodes 51. In the embodiment of FIG. 5, each mesh element is in the form of a triangle. A strain value measured by one grating 22 is assigned to one node 51.

Referring to FIG. 5, in order to insure that the inverse finite element method converges on an accurate solution, additional nodes 52 and, therefore, additional mesh elements are created for the mesh grid 50. A strain value assigned to one additional node 52 is derived from the strain values assigned to nodes of adjacent mesh elements. The additional strain value can be derived using several methods. In one method, the additional strain value is derived by linearly interpolating from the strain values assigned to the nodes 51 of adjacent mesh elements. In another method, the additional strain value is derived by interpolating from the nodes 51 of the adjacent mesh elements using a least squares analysis, also known as ordinary least squares analysis. The least squares analysis is a method for linear regression that determines the values of unknown quantities in a statistical model by minimizing the sum of the squared residuals (the difference between the predicted and observed values).

Once the strain values for the nodes 51 and the additional nodes 52 are assigned, then the mesh grid 50 with the assigned strain values is input to the processing unit 28 to execute the inverse finite element method. The inverse finite element method will then calculate the displacements undergone by the structure 10 and, therefore, estimate the new shape of the structure 10.

FIG. 6 presents one example of a method 60 for estimating a shape of the structure 10. The method 60 calls for (step 61) selecting the structure 10 that includes a plurality of strain sensors 22 disposed upon the structure 10. Further, the method 60 calls for (step 62) placing the structure 10 in the borehole 2. Further, the method 10 calls for (step 63) receiving strain measurements from the plurality of strain sensors 22. Further, the method 60 calls for (step 64) creating the mesh grid 50 including the nodes 51. Each node 51 is related to a location of one strain sensor 22 and assigned a strain value measured by the one strain sensor 22. Further, the method 60 calls for (step 65) creating the additional node 52 wherein a strain value assigned to the additional node 52 is derived from the strain value corresponding to at least one adjacent node 51. Further, the method 60 calls for (step 66) performing the inverse finite method using the mesh grid 50 that includes the nodes with the assigned strain values to estimate the shape.

Generally, some of the teachings herein are reduced to an algorithm that is stored on machine-readable media. The algorithm is implemented by the processing unit 28 and provides operators with desired output. The output is typically generated on a real-time basis.

The processing unit 28 may be used to provide real-time estimation of the shape of the downhole structure 10. As used herein, generation of strain measurements in "real-time" is taken to mean generation of strain measurements at a rate that is useful or adequate for making decisions during or concurrent with processes such as production, experimentation, verification, and other types of surveys or uses as may be opted for by a user or operator. Accordingly, it should be recognized that "real-time" is to be taken in context, and does not necessarily indicate the instantaneous determination of data or strain measurements, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

In support of the teachings herein, various analysis components may be used, including digital and/or analog systems. The digital and/or analog systems may be included in the processing unit 28 for example. The system may have components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force, digital signal processor, analog signal processor, sensor, transmitter, receiver, transceiver, controller, optical unit, optical connector, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a shape of a structure, the method comprising:
    selecting a structure comprising a plurality of strain sensors in operable communication with the structure, each strain sensor configured to provide a measurement of strain experienced by the structure;
    placing the structure in a borehole;
    receiving the strain measurements from the plurality of strain sensors using a processing unit;

creating a mesh grid comprising nodes overlaid upon a surface of the structure using the processing unit, each node related to a location of one strain sensor and assigned a strain value measured by the one strain sensor;

creating an additional node overlaid upon the surface of the structure for the mesh grid using the processing unit wherein a strain value assigned to the additional node is derived from the strain value corresponding to at least one adjacent node; and performing an inverse finite method using the mesh grid with the assigned strain values to estimate the shape of the structure using the processing unit;

wherein the additional node for the mesh grid is created before performing the inverse finite method.

2. The method of claim 1, wherein the plurality of strain sensors comprises fiber Bragg gratings within an optical fiber.

3. The method of claim 1, wherein receiving the strain measurements comprises using a multiplex method.

4. The method of claim 3, wherein the multiplex method comprises optical frequency domain multiplexing.

5. The method of claim 4, wherein the multiplex method comprises time domain multiplexing.

6. The method of claim 4, wherein the multiplex method comprises at least one of amplitude multiplexing, phase multiplexing, and polarization multiplexing.

7. The method of claim 1, wherein the mesh grid comprises at least one mesh element.

8. The method of claim 7, wherein the at least one mesh element has three sides.

9. The method of claim 7, wherein the at least one mesh element has four sides.

10. The method of claim 7, wherein the at least one mesh element is at least one of linear, quadratic, and cubic.

11. The method of claim 1, wherein the strain value assigned to the additional node is derived from a linear interpolation of the strain value corresponding to the at least one adjacent node.

12. The method of claim 1, wherein the strain value assigned to the additional mesh element is derived from a least squares interpolation of the strain value corresponding to the at least one adjacent node.

13. The method of claim 1, wherein the strain value assigned to the additional node is derived from a smooth curve fit of the strain value corresponding to the at least one adjacent node.

14. A system for estimating a shape of a structure disposed downhole, the system comprising:

the downhole structure;

a plurality of strain sensors in operable communication with the downhole structure, each strain sensor providing a measurement of strain experienced by the downhole structure; and a processing unit in operable communication with the plurality of strain sensors wherein the processing unit:

processes the strain measurements from the strain sensors;

creates a mesh grid comprising nodes overlaid upon a surface of the structure, each node related to a location of one strain sensor and assigned a strain value measured by the one strain sensor;

creates an additional node overlaid upon the surface of the structure for the mesh grid wherein a strain value assigned to the additional node is derived from the strain value corresponding to at least one adjacent node; and performs an inverse finite method using the mesh grid with the assigned strain values to estimate the shape;

wherein the additional node for the mesh grid is created before the processing unit performs the inverse finite method.

15. The system of claim 14, wherein the plurality of strain sensors comprises fiber Bragg gratings within an optical fiber.

16. The system of claim 15, wherein at least one grating is less than 5 millimeters (mm) long and the space between two gratings is less than 10 mm.

17. The system of claim 14, further comprising a fiber optic strain system.

18. The system of claim 14, wherein the strain value assigned to the additional node is derived from the strain value corresponding to the at least one adjacent node using at least one of linear interpolation, least squares interpolation, and smooth curve fit.

19. The system of claim 14, wherein the mesh grid comprises mesh elements that are at least one of linear, quadratic, and cubic.

20. A non-transitory computer readable medium containing computer instructions stored therein for estimating a shape of a structure disposed downhole by causing a computer processor to perform steps of:

receiving strain measurements from a plurality of strain sensors in operable communication with the downhole structure, each strain sensor providing a measurement of strain experienced by the downhole structure;

creating a mesh grid comprising nodes overlaid upon a surface of the structure, each node related to a location of one strain sensor and assigned a strain value measured by the one strain sensor;

creating an additional node overlaid upon the surface of the structure for the mesh grid wherein a strain value assigned to the additional node is derived from the strain value corresponding to at least one adjacent node;

performing an inverse finite method using the mesh grid with the assigned strain values to estimate the shape; and at least one of recording the shape and displaying the shape to a user;

wherein the additional node for the mesh grid is created before performing the inverse finite method.

* * * * *